United States Patent [19]

Shiraishi et al.

[11] Patent Number: 5,589,882
[45] Date of Patent: Dec. 31, 1996

[54] INTEGRAL INFRARED ABSORBING OPTICAL LOW-PASS FILTER

[75] Inventors: Akihiko Shiraishi; Kazuo Fujibayashi, both of Kawasaki; Tetsuo Kuwabara, Urawa, all of Japan

[73] Assignee: Canon Kabushiki Kaisha, Tokyo, Japan

[21] Appl. No.: 455,250

[22] Filed: May 31, 1995

Related U.S. Application Data

[63] Continuation of Ser. No. 539,175, Jun. 18, 1990, abandoned.

[30] Foreign Application Priority Data

Jun. 20, 1989 [JP] Japan .................................. 1-157031

[51] Int. Cl.⁶ .................................................. H04N 5/225
[52] U.S. Cl. .......................... 348/340; 359/356; 359/342
[58] Field of Search ...................................... 348/335, 340, 348/342; 359/350, 355, 356, 571, 563, 568; H04N 5/225

[56] References Cited

U.S. PATENT DOCUMENTS

| | | | |
|---|---|---|---|
| 3,940,788 | 2/1976 | Abe et al. ................................ | 358/43 |
| 4,068,260 | 1/1978 | Ohneda et al. ........................... | 358/44 |
| 4,105,289 | 8/1978 | Hershel .............................. | 350/162 SF |
| 4,178,611 | 12/1979 | Okano .................................... | 358/44 |
| 4,477,148 | 10/1984 | Tsuji et al. ............................. | 350/286 |
| 4,659,178 | 4/1987 | Kyogoku ................................. | 350/166 |
| 4,763,966 | 8/1988 | Suzuki et al. ............................ | 350/1.1 |
| 4,807,981 | 2/1989 | Takizawa et al. ....................... | 350/404 |

FOREIGN PATENT DOCUMENTS

| | | | |
|---|---|---|---|
| 53-1119063 | 10/1978 | Japan .............................. | G02B 27/38 |
| 61-13774 | 1/1986 | Japan .............................. | H04N 5/225 |

*Primary Examiner*—Wendy Garber
*Assistant Examiner*—Tuan V. Ho
*Attorney, Agent, or Firm*—Fitzpatrick, Cella, Harper & Scinto

[57] ABSTRACT

An optical low-pass filter includes an optical member formed of a material capable of absorbing light in a particular wavelength range, e.g., an infrared range. The optical member has a plurality of ridge-like portions formed on at least one surface thereof at a predetermined pitch. The ridge-like portions comprise a phase type diffraction grating which has a low-pass filtering effect with respect to bundles of optical transmission rays passing therethrough.

10 Claims, 3 Drawing Sheets

INTEGRAL INFRARED ABSORBING OPTICAL LOW-PASS FILTER

This application is a continuation of application Ser. No. 07/539,175 filed Jun. 18, 1990, now abandoned.

BACKGROUND OF THE INVENTION

1. Field of the Invention

This invention relates generally to an optical low-pass filter and, more particularly, to an optical low-pass filter suitable for discretely forming images which are picked up using an image pickup element such as an image pickup tube or plate in a video camera, electronic still camera or the like.

2. Description of the Prior Art

In general, in a video camera system or the like using a solid-state image pickup element having a discrete pixel structure, image data is spatially sampled to obtain an output image signal.

In this system, if the received image contains spatial components of frequencies higher than the sampling frequency, signals unrelated to the form and the colors of the object or, in particular, pseudo color signals are frequently generated. That is, frequency components (having frequencies higher than the Nyquist frequency) which cannot be sampled by the camera are not reproduced as image data and may cause waveform distortions (aliases), moiré fringes, pseudo colors, and so on.

Conventionally, an optical low-pass filter is inserted in the picture taking optical system to suppress high frequency spatial components of the received image. A type of optical low-pass filter such as a crystal plate using double refraction is ordinarily used for this purpose.

FIG. 6 shows an optical system having an imaging system in which a conventional optical low-pass filter formed of a crystal plate utilizing double refraction is provided.

The optical system shown in FIG. 6 has an imaging lens 44, and an image pickup element 48 such as a CCD. The light receiving portion of the image pickup element 48 is covered with a checkerboard-like color filter 42. A protective cover glass 47 is disposed in front of the light receiving portion. An infrared light cutting filter 45 and an optical low-pass filter 46 (comprising a crystal plate and integrally attached to the infrared light cutting filter 45) are disposed between the imaging lens 44 and the image pickup element 48. As is well known, the low-pass effect of the optical low-pass filter 46 resides in separating ordinary and extraordinary rays from incident rays.

However, crystal plates are expensive and the use of a crystal plate increases the overall length of the optical system because it is necessary for the crystal plate to have a substantially large thickness to separate out a certain amount of incident rays.

Japanese Patent Laid-Open Patent Publication No. 53-119063 discloses an optical low-pass filter using a phase type diffraction grating. According to this publication, a desired low-pass effect can be obtained by forming a suitable diffraction image using a diffraction effect.

This type of diffraction grating optical low-pass filter offers a reduced manufacturing cost and a reduced thickness compared with crystal plate optical low-pass filters. Further, it is not necessary for the diffraction grating optical-low pass filter to be disposed at the rear of the imaging lens; it may be disposed at a freely selected position. It is therefore easy to limit the overall size of the imaging system using such an optical low-pass filter.

In video cameras or electronic still cameras, as described above, the infrared light cutting filter 45 (for luminosity compensation) and the optical low-pass filter 46 formed of, e.g., a crystal plate, are inserted in the imaging system independently of each other or in a combined state, as shown in FIG. 6. It is necessary for the infrared light cutting filter and the optical low-pass filter to have a certain substantial thicknesses to optimize their effects. Ordinarily, if a plurality of filters having certain thicknesses are provided in an imaging system, the mechanical and optical construction of the imaging system becomes complicated, resulting in difficulty in reducing the overall size of the imaging system.

SUMMARY OF THE INVENTION

It is an object of the present invention to provide an optical low-pass filter having a simple construction, capable of cutting rays in a particular wavelength range or, more specifically, in an infrared range, capable of being effectively improved in low-pass filtering effects, and capable of simplifying the whole of the imaging system and improving the facility with which the imaging system is assembled.

Another object of the present invention is to provide an optical low-pass filter having a phase type diffraction grating comprising ridge-like portions formed on a surface of an optical member which can absorb light in a particular wavelength range, the ridge-like portions being arranged at a predetermined pitch.

Still another object of the present invention is to provide an optical low-pass filter in which the optical member is formed of a material which can absorb light in the infrared range, and in which the ridge-like portions are formed on the optical member at a predetermined pitch by heating and pressing.

In accordance with a first aspect of the present invention, an optical low-pass filter includes an optical member having a property of absorbing light in a predetermined wavelength range. The optical member has a plurality of ridge-like portions formed on at least one surface thereof at a predetermined pitch. The ridge-like portions comprise a phase type diffraction grating, the diffraction grating having a low-pass filtering effect with respect to bundles of optical transmission rays passing therethrough.

According to a further aspect of the present invention, an optical low-pass filter includes an optical member having a property of absorbing light in a predetermined wavelength range. The optical member includes a plurality of ridge-like portions heat-pressed on a surface thereof at a predetermined pitch. The ridge-like portions comprise a phase-diffraction grating which has a low-pass filtering effect with respect to bundles of optical transmission rays passing therethrough.

According to a further aspect of the present invention, an imaging apparatus, an imaging apparatus for use with an objective lens includes a solid-state image pickup element having a light receiving portion for receiving an image formed by the objective lens. The image pickup element then outputs a video signal. A color filter covers the light receiving portion and has a plurality of color filter elements arranged at a predetermined pitch. An optical low-pass filter is provided and is formed of a material capable of cutting light in a predetermined wavelength range to effect luminosity correction for said solid-stage image pickup element. The optical low-pass filter has on at least one surface thereof a phase type diffraction grating. The phase type diffraction grating has a grating pitch dimensioned to produce diffraction images which suppress a part of component frequencies of bundles of optical rays incident upon the color filter. The suppressed part of the component frequencies have frequencies higher than a resolution limit frequency determined by the pitch of said color filter elements.

According to yet a further aspect of the present invention, a video camera includes an objective lens having an aperture, and a solid-state image pickup element having a light receiving portion for receiving an image formed by the objective lens. A color filter is provided and covers the light receiving portion of the solid-state image pickup element, and has a plurality of color filter elements arranged at a predetermined pitch. An optical low-pass filter is provided and is formed of a material capable of cutting light in a predetermined wavelength range to effect luminosity correction for the solid-state image pickup element. The optical low-pass filter is disposed adjacent to the aperture of the objective lens. Further, the optical low-pass filter has on at least one surface thereof a phase type diffraction grating having a grating pitch dimensioned to produce diffraction images to suppress frequencies higher than a resolution limit frequency determined by the pitch of the color filter elements.

According to yet a further aspect of the present invention, an optical low-pass filter assembly includes a low-pass filter formed of an optical glass plate having a particular wavelength range. The low-pass filter has at least one phase type diffraction grating comprising a plurality of ridge-like portions of the optical glass plate formed on a surface thereof at a predetermined pitch dimensioned to produce a low-pass filtering effect with respect to bundles of optical transmission rays passing therethrough. A pair of protective plates are respectively attached to front and rear surfaces of the low-pass filter to protect said filter. Each of the protective plates has a refractive index different from that of the optical glass plate.

DESCRIPTION OF THE PREFERRED EMBODIMENTS

Figure 1:
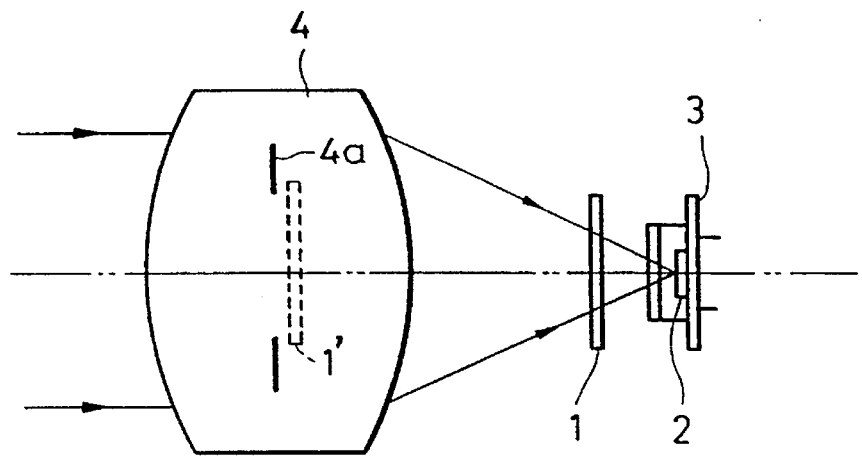
FIGS. 1 is a cross-sectional view of an imaging optical system having an optical low-pass filter according to a first embodiment of the present invention is inserted.

FIG. 1 schematically illustrates an optical low-pass filter which represents an embodiment of the present invention and which is inserted in an imaging system.

An imaging lens 4, which may actually be a lens assembly consisting of a plurality of lens elements, is fixed to or detachably attached to a camera body (not shown). An optical low-pass filter 1 comprises an optical plate formed of a phosphate glass having properties for absorbing infrared light, and is used for luminosity correction. A phase type diffraction grating 1A (comprising ridge-like portions) is formed on a surface of the optical plate on the side of the imaging plane. The ridge-like portions are arranged at a predetermined pitch. An area type solid state image pickup element 3 is also provided. A color filter 2 is disposed so as to cover a light receiving portion 3A of the solid state image pickup element 3.

Figure 2:
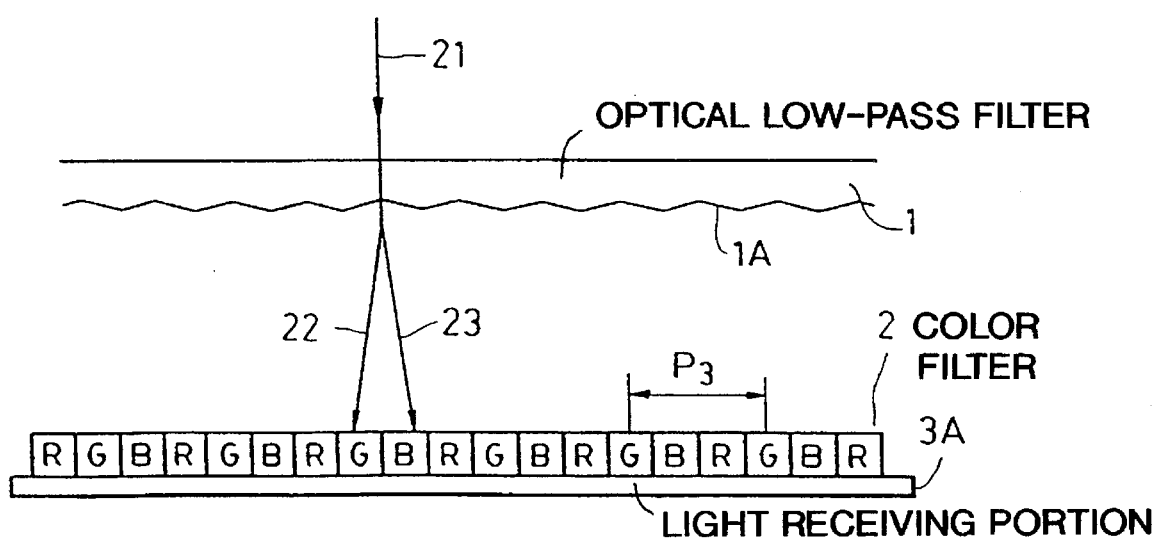
FIG. 2 is a schematic enlarged view of the optical low-pass filter and the image pickup element shown in FIG. 1.

FIG. 2 shows an enlarged cross section of the light receiving portion of the optical low-pass filter 1 and the light receiving portion 3A of the image pickup element 3 shown in FIG. 1. The structure of the optical low-pass filter 1 is such that a multiplicity of fine triangular prisms are regularly arranged on its one surface.

The ridge-like portions of the optical low-pass filter of this embodiment are formed in such a manner that a plate formed of an infrared light absorbing material such as a phosphate glass is heated and is pressed with a mold formed of a material which does not react on this infrared light absorbing material.

Figures 3A, 3B, 4:
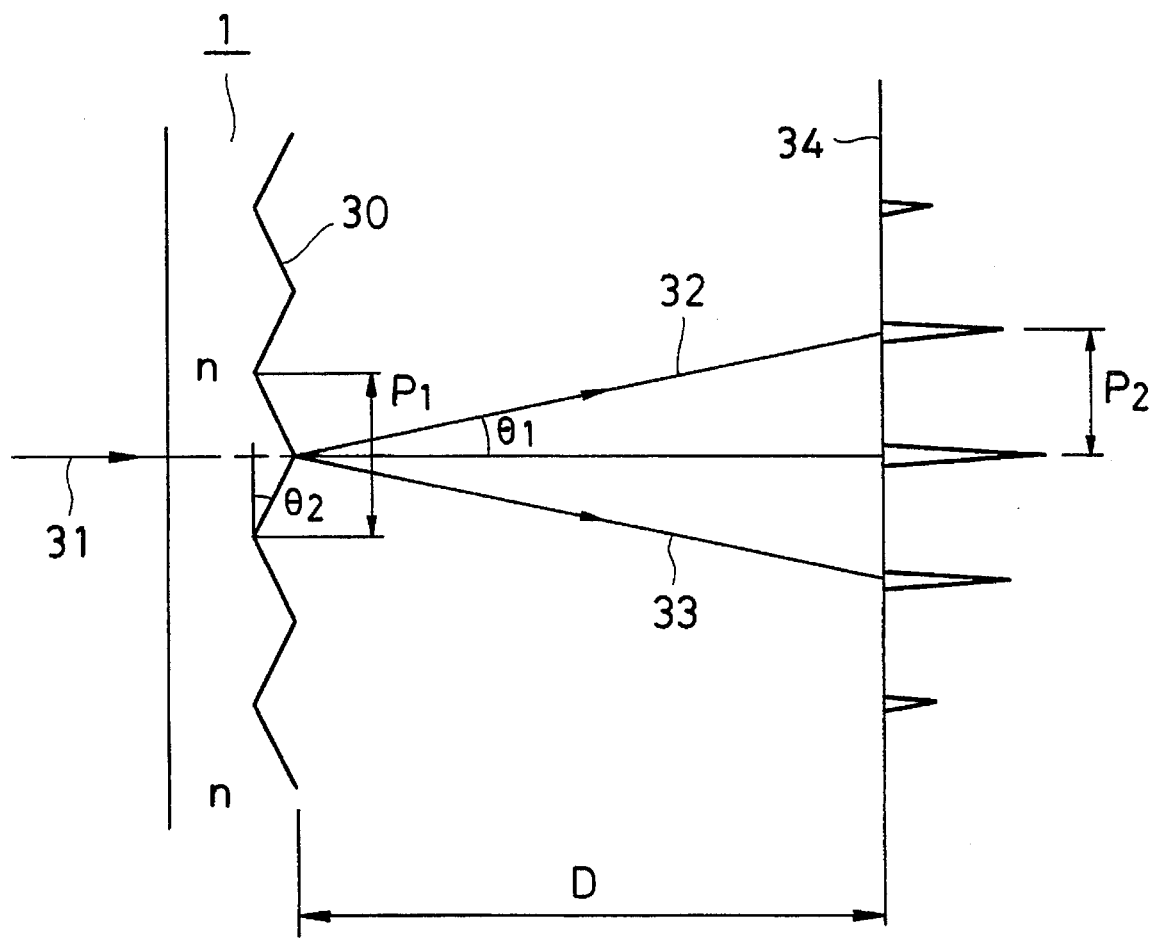
FIGS. 3A and 3B are diagrams of modified examples of the surface configuration of the optical low-pass filter.
FIG. 4 is a diagram showing the separation of a bundle of rays effected by the optical low-pass filter shown in FIG. 2.

The diffraction grating 1A according to this embodiment is not limited to the above-described type consisting of triangular prims; it may be formed by an array of fine rectangular prisms such as those shown in FIG. 3A, or fine trapezoidal prisms such as those shown in FIG. 3B.

The color filter 2, which is provided on the light receiving element array 3A, is a two-dimensional color filter array having a plurality of color filter elements R, G, and B, i.e., red elements, green elements and blue elements each arranged at a pitch $P_3$. The light receiving element array 3A separates red, green and blue colors in accordance with signals obtained from picture elements corresponding to the color filter elements of the color filter array 2.

The optical low-pass filter 1 separates at least two bundles of rays 22 and 23 from a bundle of incident light 21 so that the separated bundles of rays 22 and 23 are incident upon the light receiving element array 3A through the color filter 2 while being spread out to a predetermined extent.

By the low-pass filtering effect obtained by the filter 1, imaging of any object image having spatial frequencies corresponding to the pitch $P_3$ of the arrangement of the color filters R, G, and B is prevented. It is thereby possible to prevent generation of pseudo color signals in a case where the object image has the same pitch $P_3$ as the arrangement of the color filters R, G, and B.

FIG. 4 is a diagram relating to the separation of a bundle of rays 31 passing through the optical low-pass filter 1 shown in FIG. 2. The optical low-pass filter 1 comprises a diffraction grating 30 having triangular prism portions arranged at a pitch $P_1$ and having a prism angle $\theta_2$. The optical low-pass filter 1 diffracts a bundle of incident rays 31 to separate it into first order diffracted bundles of rays 32 and 33 so that these two bundles of rays are incident upon a color filter surface 34 while being spaced apart from each other by a pitch $P_2$. The prism angle $\theta_2$ is set to a suitable angle such that a primary diffraction image or a secondary diffraction image obtained by diffraction of bundles of incident rays through the fine prisms is emphasized and brought to emergence, thereby reducing the intensity of high order diffraction images and optimizing the separation of the bundle of rays.

In the arrangement shown in FIG. 1, the optical low-pass filter 1 is disposed closer to the solid state image pickup element 3 than to the final lens surface of the imaging lens 4. However, the optical low-pass filter may be disposed at the position of the pupil of the imaging lens 4 or, more practically, at a position 1' in the vicinity of an aperture 4a. On the other hand, the optical low-pass filter can also be disposed in the vicinity of the color filter 2. In this case, the low-pass filter can function as a protective glass covering.

Figure 5:
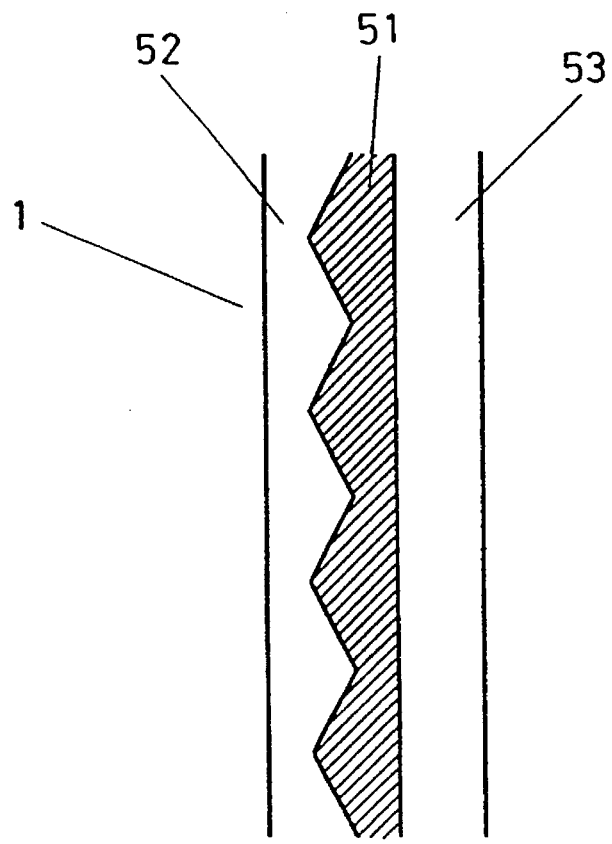
FIG. 5 is a cross-sectional view of an optical low-pass filter according to a second embodiment of the present invention.
Figure 6:
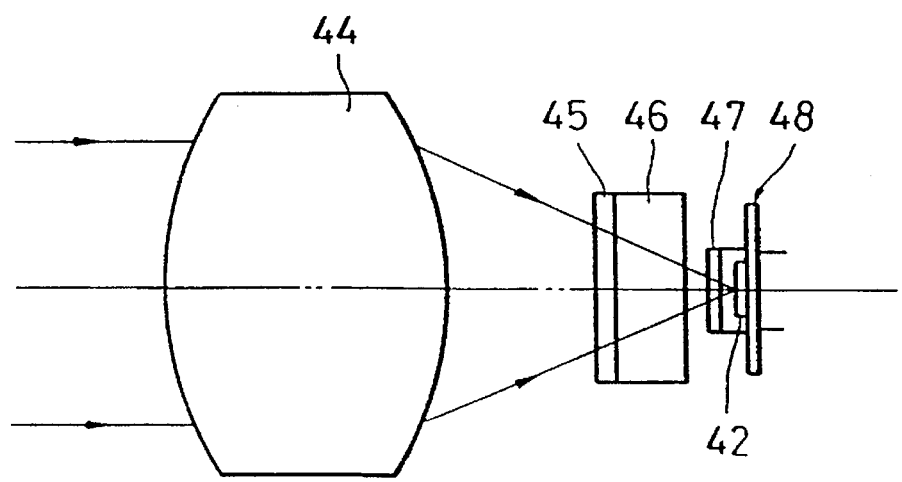
FIG. 6 is a diagram of an imaging system having a conventional optical low-pass filter.

FIG. 5 is a cross-sectional view of an optical low-pass filter which represents a second embodiment of the present invention. While the filter in accordance with the above-described first embodiment is designed for cameras for consumer use, the second embodiment is suitable for professional use in a demanding environment. The optical low-pass filter 1 shown in FIG. 5 has an optical member 51 formed of a material such as a phosphate glass having the effect of absorbing light in the infrared range. Ridge-like portions (having, for example, a triangular wave cross section) are formed on one surface of the optical member 51. The optical low-pass filter 1 also has a transparent base plate 52 and another transparent base plate 53 having plane-parallel surfaces. The transparent base plate 52 has a plane surface and a ridged surface having ridge-like portions complementary to the ridge-like portions of the optical member 51.

The optical low-pass filter 1 in accordance with this embodiment is constructed by using a material for the transparent base plates 52 and 53 having a refractive index different from that of the optical member 51, e.g., a plastic, and fixing the transparent base plates to each other with the optical member 51 sandwiched therebetween.

Ordinarily, phosphate glasses used as materials for absorbing light in the infrared range are poor in resistance to moisture. In accordance with the second embodiment, therefore, the optical member formed of a phosphate glass is interposed between the transparent base plates 52 and 53 formed of a material having superior moisture resistance, as shown in FIG. 5, thereby effectively stabilizing the infrared cutting effect and the low-pass filtering effect against moisture.

If, in the second embodiment, a moisture-proof coating and an anti-reflection coating are formed on the incident and emergent surfaces, the optical low-pass filter can be further improved in stability and optical performance.

A second ridged surface grating may be formed on the other surface of the optical low-pass filter 1. In this case, the directions in which light is diffracted by the two gratings intersect each other.

The optical low-pass filter in accordance with the present invention can be disposed in front of or inside the imaging lens assembly as well as at the rear thereof. It is thereby possible to reduce the back focus of the imaging lens and to thereby reduce the overall size of the imaging system including the mechanical and optical structures. It is also possible to avoid any damage to the filter surface and the accumulation of extraneous debris on the filter surface, because the filter surface does not enter the range of the depth of focus of the imaging lens.

The member on which are formed the ridge-like portions having the low-pass filtering effect in accordance with the described embodiments is not limited to an optical member for cutting infrared light; the ridge-like portions may be formed on other kinds of optical members including a color temperature conversion filter and a color filter, etc.

In accordance with the present invention, a phase type diffraction grating comprising ridge-like portions arranged at a predetermined pitch is provided on a surface of an optical member, e.g., a member having an effect of absorbing light in an infrared range, thereby realizing an optical low-pass filter which is effectively improved in both the infrared light cutting effect and the low-pass filtering effect while the whole of the imaging system is simplified and the assembly facility is improved.

The individual components shown in outline or designated by blocks in the drawings are schematic only and are well known in the optical field. Therefore, the specific construction and operation of such components are not critical to the operation or best mode for carrying out the invention.

While the present invention has been described with respect to what are presently considered to be the preferred embodiments., it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical low-pass filter comprising:
   a single optical member formed of a material having a property of absorbing infrared light in a predetermined wavelength range, said optical member having a plurality of ridge-like portions formed on at least one surface thereof at a predetermined pitch, said ridge-like portions comprising a phase type diffraction grating, said diffraction grating having a low-pass filtering effect with respect to bundles of optical transmission rays to prevent production of pseudo-colors.

2. An optical low-pass filter according to claim 1, wherein said optical member has the property of absorbing light in an infrared range.

3. An optical low-pass filter comprising:
   a single optical member formed of a material having a property of absorbing light in a predetermined wavelength range, said optical member having a plurality of ridge-like portions heat-pressed on a surface thereof at a predetermined pitch, said ridge-like portions comprising a phase type diffraction grating, said diffraction grating having a low-pass filtering effect with respect to bundles of optical transmission rays.

4. An imaging apparatus for use with an objective lens, comprising:
   a solid-state image pickup element having a light receiving portion, for receiving an image formed by the objective lens, said image pickup element outputting a video signal;
   a color filter covering said light receiving portion and having a plurality of color filter elements arranged at a predetermined pitch; and
   an optical low-pass filter formed of a single member capable of cutting infrared light in a predetermined wavelength range to effect luminosity correction for said solid-state image pickup element, said optical low-pass filter having on at least one surface thereof a phase type diffraction grating having a grating pitch dimensioned to produce diffraction images which suppress a part of component frequencies of bundles of optical rays incident upon said color filter to prevent production of pseudo-colors, the suppressed part of the component frequencies having frequencies higher than a resolution limit frequency determined by the pitch of said color filter elements.

5. An imaging apparatus according to claim 4, wherein said diffraction grating is provided on a surface of said optical low-pass filter facing said solid-state image pickup element.

6. An imaging apparatus according to claim 4, wherein the predetermined wavelength range is the infrared range.

7. An imaging apparatus according to claim 4, wherein said diffraction grating comprises a heat-pressed grating.

8. An imaging apparatus according to claim 4, wherein said optical low-pass filter comprises a phosphate glass.

9. A video camera comprising:

an objective lens having an aperture;

a solid-state image pickup element having a light receiving portion, for receiving an image formed by the objective lens, said image pickup element outputting a video signal;

a color filter covering said light receiving portion and having a plurality of color filter elements arranged at a predetermined pitch; and an optical low-pass filter formed of a single member capable of cutting infrared light in a predetermined wavelength range to effect luminosity correction for said solid-state image pickup element, said optical low-pass filter being disposed adjacent to said aperture of said objective lens, said optical low-pass filter having on at least one surface thereof a phase type diffraction grating having a grating pitch dimensioned to produce diffraction images to suppress frequencies higher than a resolution limit frequency determined by the pitch of said color filter elements to prevent production of pseudo-colors.

10. An optical low-pass filter assembly comprising:

a low-pass filter comprising a single optical member formed of an optical glass plate having a property of absorbing light in a particular wavelength range, said low-pass filter having at least one phase type diffraction grating comprising a plurality of ridge-like portions of said optical glass plate formed on a surface thereof at a predetermined pitch dimensioned to produce a low-pass filtering effect with respect to bundles of optical transmission rays passing therethrough; and a pair of protective plates respectively attached to front and rear surfaces of said low-pass filter to protect said filter, each of said protective plates having a refractive index different from that of said optical glass plate.

* * * * *

UNITED STATES PATENT AND TRADEMARK OFFICE
CERTIFICATE OF CORRECTION

PATENT NO. : 5,589,882
DATED : December 31, 1996
INVENTOR(S) : Shiraishi, et al.

It is certified that error appears in the above-indentified patent and that said Letters Patent is hereby corrected as shown below:

COLUMN 2

Line 9, "a" should be deleted.

Signed and Sealed this

Eighth Day of July, 1997

Attest:

BRUCE LEHMAN

Attesting Officer

Commissioner of Patents and Trademarks